(12) United States Patent
Beili et al.

(10) Patent No.: US 8,837,531 B2
(45) Date of Patent: Sep. 16, 2014

(54) METHOD AND APPARATUS FOR RESILIENT CLOCK TRANSFER OVER MULTIPLE DSL LINES

(75) Inventors: Edward Beili, Givat Zeev (IL); Mauricio Nurko, Petach-Tikva (IL)

(73) Assignee: Actelis Networks (Israel) Ltd., Petach Tikva (IL)

(*) Notice: Subject to any disclaimer, the term of this patent is extended or adjusted under 35 U.S.C. 154(b) by 455 days.

(21) Appl. No.: 12/935,837

(22) PCT Filed: Apr. 7, 2009

(86) PCT No.: PCT/US2009/039828
§ 371 (c)(1),
(2), (4) Date: Feb. 21, 2011

(87) PCT Pub. No.: WO2009/126665
PCT Pub. Date: Oct. 15, 2009

(65) Prior Publication Data
US 2011/0261842 A1   Oct. 27, 2011

Related U.S. Application Data

(60) Provisional application No. 61/043,071, filed on Apr. 7, 2008.

(51) Int. Cl.
*H04J 3/06* (2006.01)
*H04L 7/00* (2006.01)
*H04L 12/28* (2006.01)
*H04W 76/00* (2009.01)

(52) U.S. Cl.
CPC .......... *H04L 12/2867* (2013.01); *H04L 7/0012* (2013.01); *H04J 3/0641* (2013.01); *H04J 3/0658* (2013.01); *H04L 7/0083* (2013.01); *H04W 76/007* (2013.01); *H04J 3/0632* (2013.01); *H04L 7/0041* (2013.01)
USPC ............................ 370/509; 370/512; 370/516

(58) Field of Classification Search
None
See application file for complete search history.

(56) References Cited

U.S. PATENT DOCUMENTS 5,850,422 A   12/1998   Chen
5,991,308 A   11/1999   Fuhrmann et al.
6,078,595 A    6/2000   Jones et al.
7,106,760 B1   9/2006   Perumal et al.

(Continued)

OTHER PUBLICATIONS

International Search Report for International Application No. PCT/US2009/039828 mailed Jun. 12, 2009.

*Primary Examiner* — Christine Duong
(74) *Attorney, Agent, or Firm* — Pearl Cohen Zedek Latzer Baratz LLP

(57) ABSTRACT

A system and method for transmitting and recovering external clock signals over links of a DSL system in which the external clock signals are used to synchronize transmitted physical layer signals from a CO of a DSL system and said external clock signals are derived from the received physical layer signals at an RT/CPE location of a DSL system. A clock recovery subsystem located at both the CO and the RT/CPE comprises a clock monitor circuit in communication with a Phase Lock Loop circuit. The clock monitor circuit at the RT/CPE is able to derive clock signals from the received physical layer signals and select one of said derived clocks to which a local reference clock at the RT/CPE is synchronized. The synchronized local reference clock, which can exist even when there are no valid derived clocks, may be used to transmit pseudowire frames (e.g., TDM data over Ethernet).

8 Claims, 3 Drawing Sheets

(56) References Cited

U.S. PATENT DOCUMENTS

| | | | |
|---|---|---|---|
| 7,286,622 B2 | 10/2007 | Sefidvash et al. | |
| 7,970,090 B1 * | 6/2011 | Tetzlaff | 375/359 |
| 2003/0035504 A1 * | 2/2003 | Wong et al. | 375/377 |
| 2003/0099285 A1 * | 5/2003 | Graziano et al. | 375/220 |
| 2004/0219959 A1 | 11/2004 | Khayrallah et al. | |
| 2004/0223567 A1 * | 11/2004 | Liu | 375/355 |
| 2006/0215689 A1 * | 9/2006 | Liu et al. | 370/465 |
| 2006/0245453 A1 * | 11/2006 | Bedrosian | 370/503 |
| 2008/0165841 A1 * | 7/2008 | Wall et al. | 375/232 |

\* cited by examiner

METHOD AND APPARATUS FOR RESILIENT CLOCK TRANSFER OVER MULTIPLE DSL LINES

CROSS-REFERENCE TO RELATED APPLICATIONS

This application is a National Phase Application of PCT International Application No. PCT/US2009/039828, entitled "METHOD AND APPARATUS FOR RESILIENT CLOCK TRANSFER OVER MULTIPLE DSL LINES", International Filing Date Apr. 7, 2009, published on Oct. 15, 2009 as International Publication No. WO 2009/126665, which in turn claims priority from U.S. Provisional Patent Application No. 61/043,071, filed Apr. 7, 2008, both of which are incorporated herein by reference in their entirety.

FIELD OF THE INVENTION

The present invention relates to the transmission and recovery of clock signals over DSL lines.

BACKGROUND OF THE INVENTION

Transmission of Constant Bit Rate (CBR) data streams, including Time Division Multiplexing (TDM) traffic, over Packet Switched Networks (PSN) is quickly becoming a necessity for telecommunication networks, as service providers and carriers migrate to PSN, abandoning traditional synchronous digital networks, based on SONET (Synchronous Optical Networking), SDH (Synchronous Digital Hierarchy) or PDH (Plesiochronous Digital Hierarchy).

There are many methods for carrying CBR traffic over PSN. These methods are usually referred to as Circuit Emulation Service (CES) or Pseudo Wire Emulation (PWE), and there are several standards that define different CES protocols, such as the Metro Ethernet Forum's MEF 8 (CESoETH) specification, and the Internet Engineering Task Force's (IETF) RFC 4553 (SAToP), RFC 5086 (CESoPSN), and RFC 5087 (TDMoIP) specifications.

An emulated TDM service (such as T1 or E1 digital signals) requires an accurate clock at the receiving end in order to deliver the service properly. An emulated TDM stream is typically implemented as a stream of data packets which are transmitted in accordance with a TDM clock. At the receiving end, the clock can be obtained from an external reference clock source or recovered from the received packet stream.

Extracting the timing information from a highly jittered source such as packet stream is a complex task, and in many cases, the recovered clock is not accurate enough for a particular TDM service. A number of methods attempt to improve the quality of the clock transport in the PSN. These methods include, but are not limited to, Adaptive Clock Recovery, Differential Clock Recovery, IEEE 1588v2, and Synchronous Ethernet, each of which is discussed briefly below.

Adaptive Clock Recovery reconstructs the original clock by analyzing the arrival time of the received data packets, and averaging their arrival rate over a sufficiently long period. Adaptive Clock Recovery can also be performed on an out-of-band packet stream with a rate related to the clock of the TDM service being emulated. Due to the inherent packet delay variation present in PSNs and the fact that the delivery of packets is not guaranteed, the clock accuracy and stability (wander) provided by Adaptive Clock Recovery is generally viewed as inadequate for applications with stringent timing requirements, such as the backhaul of cellular TDM traffic.

Differential Clock Recovery uses an accurate external clock source at both sides (transmitter and receiver) of the link. The transmitter uses this external clock source as a reference and transmits the difference between the external reference clock and the TDM service clock to the receiver. The receiver aligns the timing of the TDM streams extracted from the received Ethernet packets with the TDM service clock source using the reference clock and the received information on the clock difference. A differential clock scheme using GPS (Global Positioning System) receivers providing highly accurate GPS clock information is used in many CDMA (Code Division Multiple Access) and WiMAX (Worldwide Interoperability for Microwave Access) wireless networks. However, providing a GPS-based clock or another similarly accurate clock source at the receiver is not always possible (e.g., a GPS signal is blocked by the nearby buildings and external antenna installation is prohibited) or may require a significant financial investment. Additionally, the clock difference information passed via the PSN reduces the usable capacity of the network.

The Institute of Electrical and Electronics Engineers' (IEEE) 1588v2 protocol is a precision clock synchronization protocol specifically designed for PSNs. This standard protocol defines special Ethernet packets that contain precise timing information derived from a highly accurate and stable clock. These special packets are intended to allow the receiver to accurately reconstruct the original accurate clock. However, the effectiveness of this standard is not yet proven, mainly because these special packets are still susceptible to the delays caused by network traffic congestion. Even if this effectiveness is proven, the replacement of existing equipment with new equipment that supports the IEEE 1588v2 standard will take time and will require significant capital expenditure by network operators. In addition, these special packets again result in additional traffic overhead that reduces the usable capacity of the network.

Synchronous Ethernet is described in recommendations G.8261 and G.8262 of the International Telecommunications Union (ITU). It uses modified Ethernet PHYs which can transmit and recover an accurate clock, with standard frequencies as specified by the IEEE 802.3 standard, via the Ethernet physical layer. As with most other methods that transmit the clock over the physical layer, Synchronous Ethernet can provide highly accurate and stable timing information without introducing additional overhead. However, the replacement of existing equipment with new equipment that supports the Synchronous Ethernet standard will take time and will require significant capital expenditure by network operators.

The IEEE in its 802.3ah-2004 standard (now a part of 802.3-2005) has defined two new Ethernet interfaces based on Digital Subscriber Line (DSL) technology: (i) 2BASE-TL, based on the G.SHDSL line code standard (SHDSL) for symmetric DSL, as specified in ITU-T G.991.2 standard, and (ii) 10PASS-TS, based on the G.VDSL line code standard for very high bit-rate DSL (VDSL), specified in the ITU-T G.993.1 standard. These symmetric interfaces allow carriers to provide native Ethernet service over regular unshielded twisted pair cabling. Both protocols allow an optional bonding (up to 32 pairs) for the aggregation of bandwidth and added resiliency. The ITU-T G.998.2 standard extends the IEEE 2BASE-TL/10PASS-TS implementation to any DSL technology. All DSL transceivers (also hereinafter referred to as "modems") allow clock transfer, either natively on HDSL or SHDSL links or via Network Timing Reference (NTR) markers on ADSL or VDSL links. Here and in the remainder of this document, the term "ADSL" includes all the variations of ADSL, ADSL-Lite, ADSL2, and ADSL2+ as defined in the ITU-T G.992.1, G.992.2, G.992.3, and G.992.5 standards and their amendments. Moreover, the term "VDSL" includes all variations of VDSL and VDSL2 as defined in the ITU-T G.993.1 and G.993.2 standards and their amendments.

Unfortunately, none of these DSL technologies overcome the limitations discussed heretofore with respect to the various clock transfer methods.

Accordingly, there is a need for resilient clock transfer over multiple DSL lines.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

DETAILED DESCRIPTION OF EMBODIMENTS OF THE INVENTION

Some embodiments of the present invention provide a method and apparatus for transmitting an accurate and resilient clock signal over the physical layer in Ethernet-based multi-pair bonded DSL links such as those described in the ITU-T G.998.2 standard, with the IEEE 802.3-2005 2BASE-TL and 10PASS-TS interfaces being special cases of such links. This clock may be used to provide relatively accurate emulated CBR/TDM data transport over the PSNs served by G.998.2 links. It will be recognized that although embodiments of the invention described in detail herein relate to G.998.2 transmission systems, the principles of the present invention are applicable to other types of communication systems, including, for example, bonded wireless channel telecommunication systems.

It will be recognized that the figures depicted herein and their descriptions are schematic, and that details may have been omitted for purposes of clarity, but that those elements will be evident to those of skill in the art. Moreover, it will be recognized that modules depicted in the schematic figures may be implemented using digital logic and sequential circuitry and/or analog circuits. Modules may further be implemented using microprocessor and/or digital signal processor with supporting circuitry that operate based on program instructions, software and/or firmware.

Figure 1:
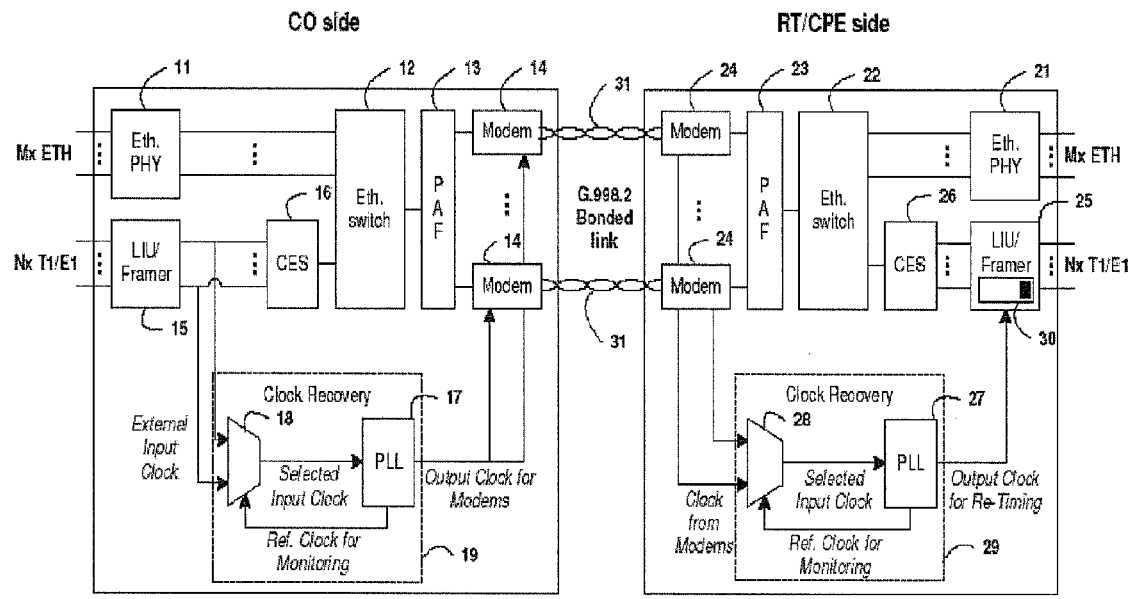
FIG. 1 is a block diagram of a G.998.2 transmission system having a clock recovery subsystem according to an embodiment of the present invention used in accordance with the method of the present invention implemented with the use of an Adaptive Clock Recovery technique.

FIG. 1 is an exemplary diagram depicting a G.998.2 transmission system using an Adaptive Clock Recovery subsystem as an apparatus embodying the present invention operated in accordance with a method embodying the present invention. As depicted, a Central Office location may be connected to an RT/CPE location via bonded G.998.2 links 31. Only those parts of the system which are considered helpful for a better understanding of the invention are shown. Other parts not shown and known by a person skilled in the related art being considered not relevant for this purpose.

At the CO side of the G.998.2 transmission system, packet data, e.g. Ethernet frames, may be received by Ethernet PHY (Physical Interface) 11, such as 10/100/1000 Base-X PHY. TDM-formatted CBR data (such as T1, E1, T3, E3 signals) or dedicated clock signals may be received and processed by Line Interface Unit (LIU)/Framer 15. The packet data may be transferred by Ethernet PHY 11 to a Packet Processor 12, e.g., an Ethernet switch or Router, which may transfer them to a G.998.2 interface 13 (shown in the embodiment depicted as a Physical Medium Entity Aggregation Function (PAF) block), which may transmit them over links 31, e.g., twisted copper pairs, via modems and/or transceivers 14. The CBR data received by LIU framer 15 may be transferred to Circuit Emulation Services (CES) Processor 16 which may encapsulate the CBR data in packets and forward them to the G.998.2 Interface 13 via Packet Processor 12, which treats the encapsulated CBR data with a higher priority than that of the original packet data. The G.998.2 interface 13 may fragment and encapsulate the frames received from the Packet Processor 12 and transmit the fragmented frames over links 31 using modems 14, as shown. LIU/Framer 15 may extract the clock signal from the received CBR data or the dedicated Clock signal, and may forward it to Clock recovery subsystem 19 according to embodiments of the present invention.

Clock recovery subsystem 19 may comprise clock monitor selector 18 coupled to a Phase Lock Loop (PLL) block 17. Clock monitor selector 18 may monitor one or more clock signals provided by LIU/Framer 15, selecting a single clock based on one or more defined criteria. A defined criterion may be, for example, to select the derived clock that is the most precise clock with respect to the local system clock, e.g., local oscillator of the PLL 17 (not shown). The selected clock may then be applied to the PLL 17, which may generate a derived output clock, synchronized to the selected clock. This synchronized derived output clock, whose frequency may be a multiple of the selected input clock, may be used as a local system clock and as a source clock for the modems 14 to transmit data.

At the RT/CPE side of the G.998.2 system of FIG. 1, the fragmented and encapsulated packet data may be received by modems 24, which may transfer the received data to PAF block 23. PAF block 23 may decapsulate the fragments, and reassemble them into original packets for further processing. The data packets may then be transferred to Ethernet Physical Interface 21 via Packet Processor 22. CES packets with emulated CBR data may be identified as such and sent to CES Processor 26 via Packet Processor 22. CES Processor 26 may reconstruct the CBR data streams from the CES packets and recover the transmited clock signal using Adaptive Clock recovery. CES Processor 26 may transfer both the clock information and the CBR data to the TDM LIU/Framer 25. The data may then be transmitted using the output clock recovered by the clock recovery subsystem 29 via a re-timing buffer 30.

Each modem 24 may generate a clock signal, using the clock recovered from the DSL physical layer signals, e.g., from the inter-arrival times of the received DSL frames (for HDSL or SHDSL links) or of the received Network Timing Reference (NTR) markers (for ADSL or VDSL links).

Clock recovery subsystem 29 may comprise a clock monitor circuit 28 coupled to Phase Lock Loop 27. Clock monitor circuit 28 may monitor the clock signals generated by the modems 24 and may select one of the clock signals as the input clock signal for the PLL 27, which in turn may generate a derived output clock, synchronized to the selected input clock. This synchronized derived output clock, whose frequency may be a multiple of the selected input clock, may be used as a local system clock and as the output clock for the LIU/Framer 25, providing an accurate clock signal and/or CBR/TDM data at the RT side. The clock selection by the Clock recovery subsystem 29 is performed in accordance with a method according to embodiments of the present invention.

Clock monitor circuit 28 may be implemented with digital logic and sequential circuitry and/or analog circuits. Clock monitor circuit 28 may further be implemented with microprocessor and/or digital signal processor with supporting circuitry that operate based on program instructions, software and/or firmware.

Phase Lock Loop 27 may be implemented in any well known fashion in which an oscillator or local system clock is maintained at a certain frequency within a desired tolerance and is able to synchronize with an input signal, e.g., another clock signal of the same or similar frequency.

Figure 2:
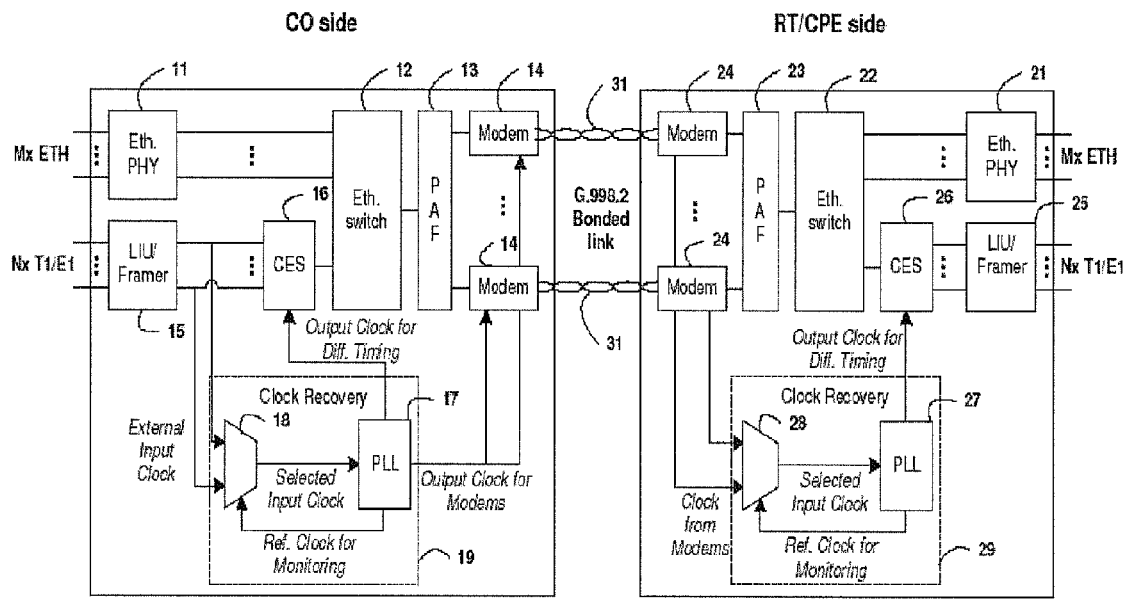
FIG. 2 is a block diagram of a G.998.2 transmission system having a clock recovery subsystem according to an embodiment of the present invention used in accordance with the method of the present invention implemented with the use of a Differential Clock Recovery technique.
Figure 3:
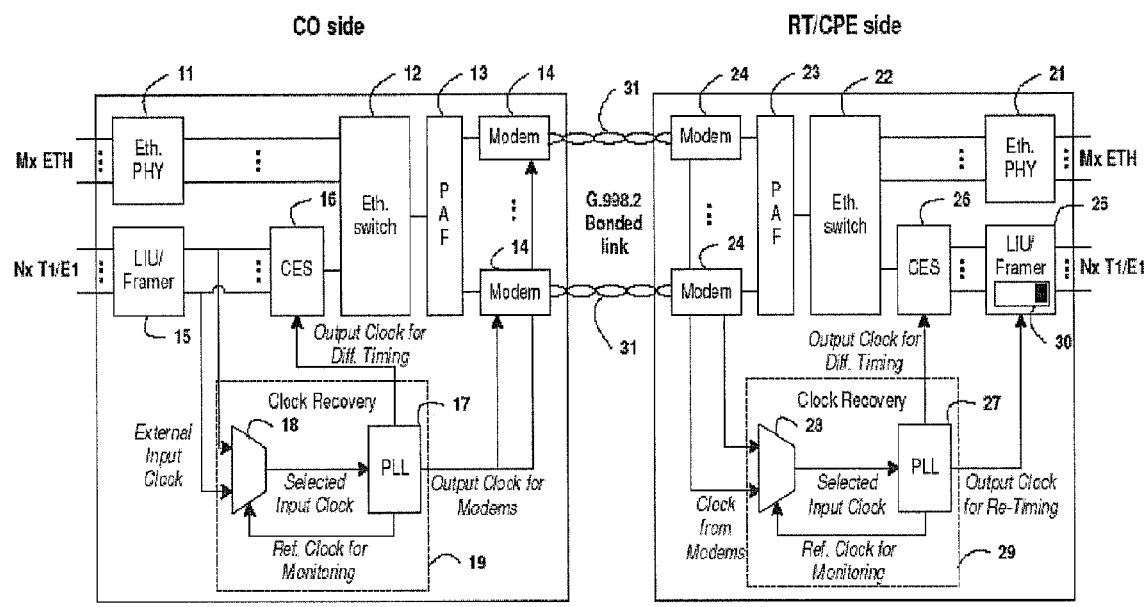
FIG. 3 is a block diagram of a G.998.2 transmission system having a clock recovery subsystem according to another embodiment of the present invention used in accordance with the method of the present invention implemented with the use of a Differential Clock Recovery technique that includes local re-timing.

FIGS. 2 and 3 show two G.998.2 systems similar to that shown in FIG. 1, in accordance with embodiments of the present invention. In contrast to the G.998.2 system shown in FIG. 1, which uses an Adaptive Clock Recovery scheme with retiming from the physical layer clock, e.g., clock extracted from the physical layer signals, the system in FIG. 2 may use a Differential Clock recovery scheme without retiming. The system in FIG. 2 may use a Differential Clock Recovery scheme where the CO location of the system uses the PLL 17 output as a clock source for the differential timing information generation, while one of the clock signals recovered from the modems 24 at the RT/CPE location may be used as an external reference clock for the CES processor 26 for differential clock recovery.

FIG. 3 shows a Differential clock Recovery embodiment of the present invention with re-timing, where the clock recovered from the modems 24 may be used as an external reference clock for the CES Processor 26 at the RT/CPE side and for re-timing purposes at the TDM transceivers 25 in case the CES Processor 26 introduces unacceptable jitter in the TDM data.

Figure 4:
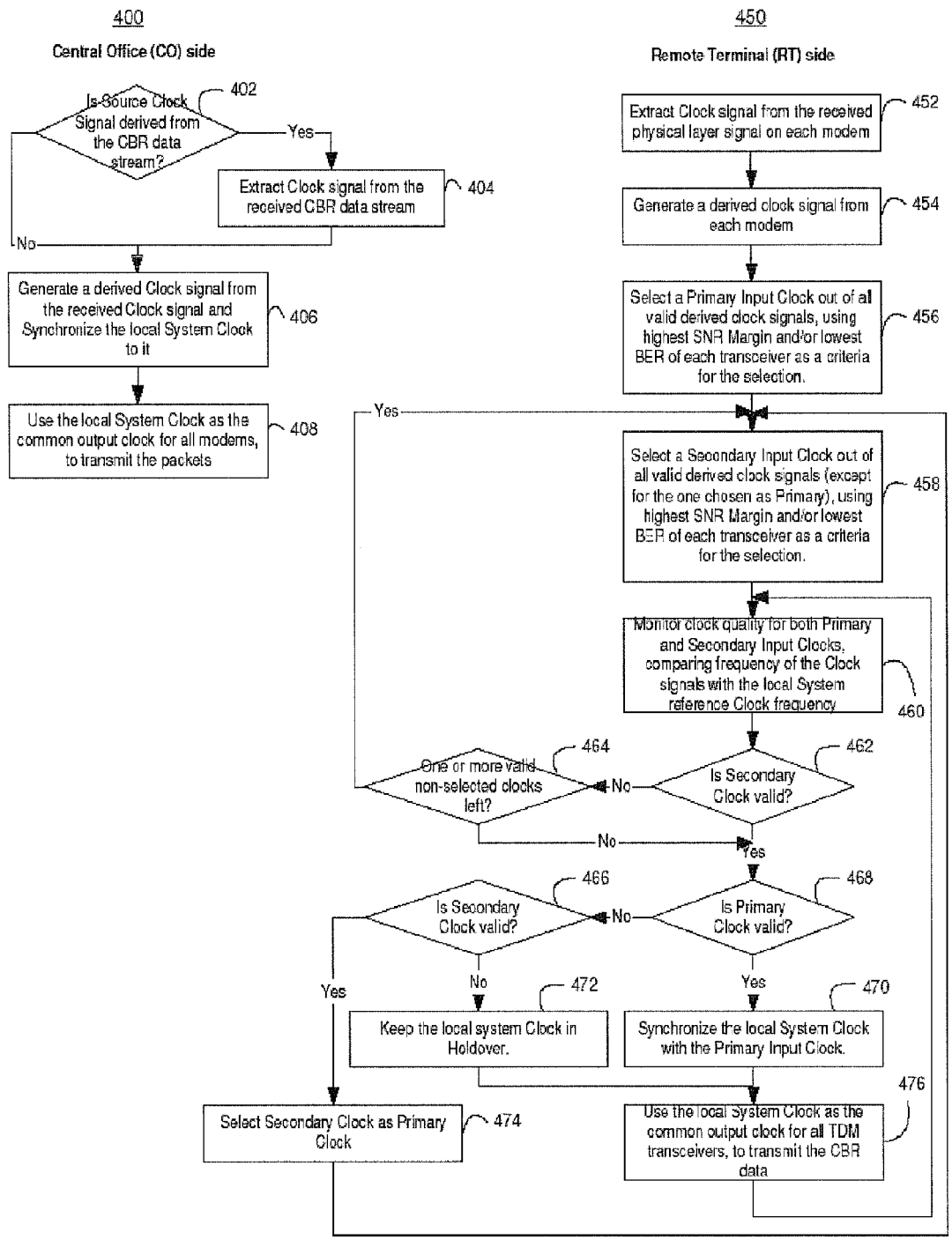
FIG. 4 shows flow diagrams of methods according to embodiments of the present invention for a Central Office location and a Remote Terminal (RT)/Customer Premises Equipment (CPE) location.

FIG. 4 depicts a method according to embodiments of the present invention for providing resilient clock transfer from the CO side to the RT side of a G.998.2 system. The depicted method may select an input clock at the CO side, said input clock possibly being extracted from an incoming CBR data stream or using a dedicated external clock signal, synchronize the local system clock to the selected input clock, and use the synchronized system clock to time the transmission of DSL frames (for HDSL or SHDSL links) or of NTR markers (for ADSL or VDSL links). At the RT side, the depicted method may recover a clock signal from each of the modems using, e.g., the inter-arrival times of the received DSL frames (for HDSL or SHDSL links) or of the received Network Timing Reference (NTR) markers (for ADSL or VDSL links), select a primary and secondary clock input out of all these recovered clock signals based on pre-defined criteria such as highest SNR (Signal to Noise Ratio) margin and/or lowest BER (Bit Error Rate), replace the primary or secondary clock with another one of the recovered clock signals if the primary or secondary clock signal becomes impaired, synchronize the local system clock to the selected primary clock, derive a synchronized output clock, and possibly use this derived output clock to time the transmission of CBR data streams.

Referring to FIG. 4, for the CO location of a G.998.2 system, a method according to an embodiment of the present invention is shown as flow chart 400. In step 402, depending on whether the source clock is derived from the data stream, it may be desirable to perform the step of deriving the clock signal from the received CBR data streams. The LIU/Framer 15 may receive CBR data streams in which clock information (or timing information) is embedded in each CBR data stream, or a dedicated external clock signal may be used instead. In the case where the clock information is embedded in the CBR data streams, the method of the present invention moves to step 404 where clock information is extracted from each of the incoming streams of CBR data.

In step 404, the extraction of clock information may be performed by LIU/Framer 16, e.g., by using the bitrate of the CBR data streams. In the case where no extraction of clock information is necessary, the method of the present invention for a CO location moves to step 406. Also, once the clock is extracted from the incoming CBR data streams, the method of the present invention for a CO location moves to step 406.

In step 406, the extracted information is used to generate a derived clock signal for each of the CBR streams received by LIU/Framer 15. The clock monitor circuit 18 may then select a clock from the set of clocks derived by LIU/Framer 15. The criteria for selecting the clock may be the clock closest in frequency to the local system clock that is derived from the local reference oscillator (not shown in FIGS. 1-3) of the PLL 17. Subsystem 19 shows that the PLL output clock is used as a reference clock for clock monitor circuit 18. Another criterion for selecting a clock may be using the clock which is the most stable (relatively little variance in frequency; relatively small jitter) for a defined period of time and is within a desired frequency tolerance with respect to the local system clock. Even after a clock is selected, clock monitor circuit 18 may continue to monitor the received clocks including the selected clock to determine if or when the selected clock does not meet the defined criteria. When the selected clock no longer meets the defined criterion, clock monitor circuit 18 may select another clock from the set of derived clocks. Regardless of the criterion used to select a clock, once a particular derived clock is selected the local system clock is synchronized to the selected derived clock. In step 408, the synchronized local system clock may be used as the common output clock to time the transmission of DSL frames (for HDSL or SHDSL links) or of NTR markers (for ADSL or VDSL links) by the modems 14 as shown in FIGS. 1-3.

Still referring to FIG. 4, for an RT location of a G.998.2 system, the method of the present invention is shown by flowchart 450. In step 452, clock or timing information may be extracted from the received physical layer signal by each of the modems 24 using, for example, the inter-arrival times of the received DSL frames (for HDSL or SHDSL links) or of the received NTR markers (for ADSL or VDSL links). This extracted clock or timing information may be used to generate a derived clock signal for each modem in step 454.

In step 456, clock monitor circuit 28 selects a Primary input clock from the set of derived clocks. Clock monitor circuit 28 may use any well known criteria to select the Primary clock from the set of derived clock signals. For example, initially, clock monitor circuit 28 may select the Primary clock from the modem 24 having the highest SNRM (Signal to Noise Ratio Margin) and/or from the modem having the lowest Bit Error Rate (BER). In step 458, the next best clock signal (based on one or more criteria) from the remaining clock signals is selected as the Secondary input clock signal. The same criteria of SNR margin and/or BER, or other criteria, may be used to initially select this Secondary clock signal. In step 460, once the Primary and Secondary clock signals are selected, clock monitor circuit 28 may monitor these selected clocks to ensure that the quality of these clock signals is above a defined threshold. For example, the selected Primary and Secondary clock signals may be periodically or continuously compared to the local system reference clock of PLL 27 to make sure that the frequency of each of the selected clocks signal is within a set tolerance of the reference clock. Once both clocks have been monitored, the method of the present invention (and in particular, clock monitor circuit 28) checks to see that they are valid, (e.g., whether they satisfy the defined threshold) in steps 462 and 468.

In step 462, the method of the present invention checks to see if the Secondary clock is valid, e.g., whether such clock meets the defined threshold. If the Secondary clock is valid, the method of the present invention moves to step 468 to check if the Primary clock is valid based on the same or different defined threshold. If the Primary clock is valid, the method of the present invention moves to step 470 in which the local system clock is synchronized to the selected Primary clock by PLL 27. In step 476, the synchronized local system clock is used as the common clock for all of the LIU/Framers 25 at the RT/CPE location of the G.998.2 system for transmission of CBR data.

Referring back to step 460 in which the quality of the Primary and Secondary clocks are being monitored. There may be a situation where the quality of the Primary clock signal has deteriorated to an unacceptable level or state, but the Secondary clock signal is still acceptable. In such case, at step 462, the Secondary clock being still valid will cause the method of the present invention to move to step 468 where it will be discovered that the Primary clock signal is not valid. In such a case, the method of the present invention moves to step 466 and then to step 474 at which point the Secondary clock is now the Primary clock and a new Secondary clock is selected from the remaining non-selected valid clocks at step 458.

Referring back once again to step 460 in which the Primary and Secondary clocks are being monitored. A situation may arise in which all of the clocks signals at the RT side, except for the current Primary clock or Secondary clock signals, are invalid. Such a situation may arise, for example, when all of the DSL links 31 of the G.998.2 system (See FIGS. 1-3), except for the link currently selected as a clock source, are nonoperational. For the case in which only the Primary clock is valid, the method of the present invention moves to step 462 where the validity of the Secondary clock is checked. The Secondary clock not being valid, the method of the present invention moves to step 464 to determine if there are any valid non-selected clocks left. As there are no other links available, the method of the present invention will move to step 468 where the Primary clock will still be valid. The method of the present invention will then move to step 470 and 476 and then back to step 458 where the RT/CPE location will continue to operate with one Primary clock and no other valid clocks. The same scenario may present itself, but with a slight variation; that is, a situation where only the Secondary clock is valid with all remaining clocks including the Primary clock being invalid. In such a case, the method of the present invention from step 460 will move to step 462 and then to step 468 at which point it will move to step 466 and then to step 474 where the secondary clock is made into a Primary clock and back to step 458 to continue to operate with only one valid clock. The above two scenarios where only one of the selected clocks is operational, is referred to as "cut line protection." As explained above, with "cut line protection," the recovered output clock at the RT/CPE side will continue to be accurate even if all but one of the copper pairs in the group of bonded DSL lines are cut or disconnected. Such a feature provides a significant increase in the resilience and availability of this accurate recovered output clock at the RT/CPE location of the DSL.

Finally, a further scenario may occur in which both the Primary and Secondary clocks are invalid and all of the remaining non-selected clocks are also invalid. Such a situation may occur when all DSL lines 31 are cut or external source clock at transmitter (e.g., at the CO location) is interrupted. From step 460, the method of the present invention moves to step 462 and then to step 464. From step 464, the method of the present invention moves to step 468 and then to step 466 where once again the Secondary clock will be determined to be invalid. From step 466, the method of the present invention will move to step 472 in which the RT/CPE location is in "Holdover" mode.

In Holdover mode, where there are no available external clocks, the method of the present invention uses previously extracted information about the external clocks to continue to generate a derived external clock for the RT/CPE side of the G.998.2 system. In particular, during the period where a valid input clock recovered from one of the modems 24 is available, clock monitor circuit 28 has a holdover subsystem (not shown in FIG. 1 through 3) that periodically compares the local reference oscillator (not shown in FIG. 1 through 3) to the synchronized local system clock and determines the frequency and phase differences between the two. These differences are stored during the time the selected input clock is valid. When the selected input clock becomes invalid and there are no other valid clocks available, the historical records of the phase and frequency differences between the local reference oscillator and the local system clock are used to maintain the local system clock (e.g., a Holdover clock).

The steps of calculating the differences (in phase and frequency) between the local reference oscillator and the local system clock, memorizing these differences for a period of time and then using these historical records to maintain a Holdover local system clock may be performed by a Holdover circuit that may be part of clock monitor circuit 28. Clock monitor circuit 28 may contain additional analog and/or digital circuitry or processor based (microprocessor or digital signal processor) circuits with supporting circuitry to generate the Holdover clock when it is operating in the Holdover mode.

From step 472, the method of the present invention moves to step 476 and continues to provide the Holdover clock to the RT/CPE side of the G.998.2 system.

While the present invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the spirit of the invention.

What is claimed is:

1. A method for transmitting data over at least a first, a second, and a third bonded communication channels each including a respective transmitter and a receiver, said method comprising:

synchronizing a timing of physical layer signals to an external clock input at the transmitter;

recovering an external clock signal from the timing of a plurality of received physical layer signals at the receiver of the first communication channel, wherein at any given moment, said first communication channel is designated as a primary channel for clock recovery, and said second communication channel is designated as a secondary channel for clock recovery;

if the external clock signal provided by the primary channel is impaired, recovering the external clock signal from the receiver of the secondary channel, and designating the secondary channel as a new primary channel;

if (a) the external clock signal provided by the secondary channel is impaired, or (b) the secondary channel becomes the primary channel, then designating the third communication channel as the secondary channel;

using the recovered external clock signal for local re-timing of pseudowire frames at the receiver, where said local re-timing involves storing the received pseudowire frames in a buffer and re-transmitting them at time intervals dictated by the recovered external clock signal;

selecting the primary and secondary channels from a plurality of communication channels as channels having a highest and second-highest signal-to-noise ratio (SNR) margin or with a lowest and second-lowest bit error ratio (BER), respectively; and selecting the primary and secondary channels from a plurality of communication channels as the channels with a best and second-best combination of high SNR margin and low BER, wherein the bonded communication channels are metallic pairs and a physical layer technology used to transmit data over the metallic pairs is G.shdsl as defined by the ITU-T G.991.2 standard and its amendments.

2. The method of claim 1, further comprising providing a self-generated holdover clock signal in a case where all clock signals used for clock generation are impaired.

3. The method of claim 1, wherein the clock recovery scheme does not impose any overhead in the transmitted data traffic.

4. The method of claim 1, wherein a bonding technology used is as defined by the ITU-T G.998.1, G.998.2 or G.998.3 standards and their respective amendments.

5. A system for transmitting data over at least a first, a second, and a third bonded communication channels each including a respective transmitter and a receiver, said system comprising:

a transmitter configured to transmit physical layer signals timed in synchronization with an external clock; and a receiver configured to:

receive physical layer signals transmitted in synchronization with a timing of physical layer signals according to an external clock;

recover an external clock signal from the timing of the received physical layer signals of the first communication channel, wherein at any given moment, said first communication channel is designated as a primary channel for clock recovery, and said second communication channel is designated as a secondary channel for clock recovery;

if the external clock signal provided by the primary channel is impaired, recover the external clock signal from the secondary channel, and designating the secondary channel as a new primary channel;

if (a) the external clock signal provided by the secondary channel is impaired, or (b) the secondary channel becomes the primary channel, then designating the third communication channel as the secondary channel;

use the recovered external clock signal for local re-timing of pseudowire frames at the receiver, where said local re-timing involves storing the received pseudowire frames in a buffer and re-transmitting them at time intervals dictated by the recovered external clock signal; and select the primary and secondary channels from a plurality of communication channels as channels having a highest and second-highest signal-to-noise ratio (SNR) margin or with a lowest and second-lowest bit error ratio (BER), respectively, wherein the receiver is further to select the primary and secondary channels from a plurality of communication channels as the channels with the best and second-best combination of high SNR margin and low BER, wherein the bonded communication channels are metallic pairs and a physical layer technology used to transmit data over the metallic pairs is G.shdsl as defined by the ITU-T G.991.2 standard and its amendments.

6. The system of claim 5, wherein the receiver is further to provide a self-generated holdover clock signal in a case where all clock signals used for clock generation are impaired.

7. The system of claim 5, wherein the clock recovery scheme does not impose any overhead in the transmitted data traffic.

8. The system of claim 5, wherein a bonding technology used is as defined by the ITU-T G.998.1, G.998.2 or G.998.3 standards and their respective amendments.

* * * * *